United States Patent
Hognaland et al.

(10) Patent No.: US 11,104,522 B2
(45) Date of Patent: Aug. 31, 2021

(54) CLEANING BIN FOR CLEANING A STORAGE GRID OF A STORAGE SYSTEM

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/844,696

(22) Filed: Apr. 9, 2020

(65) Prior Publication Data
US 2020/0283239 A1  Sep. 10, 2020

Related U.S. Application Data

(63) Continuation of application No. 16/072,705, filed as application No. PCT/EP2017/051994 on Jan. 31, 2017, now Pat. No. 10,654,661.

(30) Foreign Application Priority Data

Feb. 1, 2016  (NO) .................................... 20160143

(51) Int. Cl.
  *B65G 45/24*  (2006.01)
  *B08B 7/00*  (2006.01)
  (Continued)

(52) U.S. Cl.
CPC ................ *B65G 45/24* (2013.01); *B08B 1/00* (2013.01); *B08B 1/002* (2013.01); *B08B 1/008* (2013.01);
(Continued)

(58) Field of Classification Search
CPC .. B08B 1/00; B08B 7/00; B08B 1/008; B08B 7/04; B08B 7/0092; B08B 1/002;
(Continued)

(56) References Cited

U.S. PATENT DOCUMENTS 4,561,554 A  12/1985  Swincicki
6,059,229 A   5/2000  Luria
(Continued)

FOREIGN PATENT DOCUMENTS

CN  101284278 A  10/2008
CN  102502144 A   6/2012
(Continued)

OTHER PUBLICATIONS

Office Action issued in the counterpart Japanese Patent Application No. 2018-527172, dated Oct. 30, 2020 (5 pages).
(Continued)

*Primary Examiner* — James R Bidwell
(74) *Attorney, Agent, or Firm* — Osha Bergman Watanabe & Burton LLP

(57) ABSTRACT

A vehicle operated cleaning bin for cleaning a storage grid of a storage system, wherein the cleaning bin includes a connector for attaching the cleaning bin to a lifting device of a remotely operating vehicle being configured to vertically convey the cleaning bin inside a column of the storage grid by aid of the lifting device, and a plurality of cleaners for removing foreign debris from the storage grid. The plurality of cleaners are arranged on at least one lateral wall of the cleaning bin.

22 Claims, 6 Drawing Sheets

(51) Int. Cl.
  *B65G 1/04*   (2006.01)
  *B08B 1/00*   (2006.01)
  *B08B 7/04*   (2006.01)
  *B65G 1/06*   (2006.01)
  *B65G 45/22*  (2006.01)

(52) U.S. Cl.
  CPC .............. *B08B 7/0092* (2013.01); *B08B 7/04* (2013.01); *B65G 1/0464* (2013.01); *B65G 1/065* (2013.01); *B65G 45/22* (2013.01); *B65G 2207/26* (2013.01)

(58) Field of Classification Search
  CPC .......... B65G 1/02; B65G 1/04; B65G 1/0464; B65G 1/0454; B65G 45/18; B65G 45/22; B65G 45/24; B65G 2207/26; B65G 1/065
  USPC .............................. 198/347.1, 494, 495, 496
  See application file for complete search history.

(56) References Cited

U.S. PATENT DOCUMENTS

| | | | |
|---|---|---|---|
| 6,325,586 | B1 | 12/2001 | Loy |
| 9,572,426 | B1 | 2/2017 | Nauseda et al. |
| 10,654,661 | B2* | 5/2020 | Hognaland ............. B08B 1/002 |
| 2006/0222479 | A1 | 10/2006 | Shiwaku et al. |
| 2013/0291332 | A1 | 11/2013 | Nakao |
| 2018/0122656 | A1 | 5/2018 | Murakami |

FOREIGN PATENT DOCUMENTS

| | | |
|---|---|---|
| DE | 20 2013 004016 U1 | 8/2014 |
| EP | 2 091 670 B1 | 8/2009 |
| EP | 2 730 344 A1 | 5/2014 |
| FR | 2 166 751 A7 | 8/1973 |
| GB | 1 404 051 A | 8/1975 |
| GB | 2541488 A | 2/2017 |
| JP | S35-15200 Y | 7/1960 |
| JP | S53-105479 U | 8/1978 |
| JP | H06-315670 A | 11/1994 |
| JP | 2002-059092 A | 2/2002 |
| JP | 2005-095724 A | 4/2005 |
| JP | 2007-168968 A | 7/2007 |
| JP | 2013-169224 A | 9/2013 |
| WO | 98/49075 A1 | 11/1998 |
| WO | 01/78910 A1 | 10/2001 |
| WO | 2008/061951 A1 | 5/2008 |
| WO | 2014/090684 A1 | 6/2014 |
| WO | 2015/019055 A1 | 2/2015 |
| WO | 2015/104263 A2 | 7/2015 |
| WO | 2015/140216 A1 | 9/2015 |
| WO | 2016/166312 A1 | 10/2016 |

OTHER PUBLICATIONS

International Search Report issued in PCT/EP2017/051994 dated Apr. 19, 2017 (7 pages).
Written Opinion of the International Searching Authority issued in PCT/EP2017/051994 dated Apr. 19, 2017 (11 pages).
International Preliminary Report on Patentability from PCT/EP2017/051994 dated Jan. 30, 2018 (16 pages).
Norwegian Search Report issued in NO 20160143 dated Sep. 5, 2016 (2 pages).
Search Report for corresponding Chinese Application No. 2017800052421, dated Jun. 2, 2020 (2 pages).

* cited by examiner

CLEANING BIN FOR CLEANING A STORAGE GRID OF A STORAGE SYSTEM

CROSS-REFERENCE TO RELATED APPLICATIONS

This application is a Continuation of application Ser. No. 16/072,705 filed on Jul. 25, 2018. Application PCT/EP2017/051994 claims priority from Application 20160143 filed on Feb. 1, 2016 in Norway.

TECHNICAL FIELD

The present invention relates to a cleaning bin for cleaning a storage grid of storage system and a method for cleaning such a storage grid.

BACKGROUND OF THE INVENTION

A remotely operating vehicle for picking up storage bins from a storage system is known. A detailed description of a relevant prior art storage system and remotely operating vehicles are given in WO 98/49075, WO2014/090684 and WO 2015/104263. More specifically the prior art storage system comprises a three dimensional storage grid containing storage bins that are stacked on top of each other to a certain height. The storage grid is normally constructed as aluminium columns or cells interconnected by top rails and a base. The storage grid may further include a plurality of horizontally orientated support beams of aluminium. A number of remotely operated vehicles, or robots, are arranged on the top rails. Each vehicle is equipped with a lift for picking up, carrying, and placing bins that are stored inside the storage grid. A complete prior art storage system and the storage grid is illustrated in FIG. 1 and FIG. 2, respectively. The storage system 13 includes a plurality of remotely operating vehicles 1 configured to move on the dedicated supporting rails 7 of the storage grid 12 and to receive and transport a storage bin 14 from a storage column/cell 11 within the grid structure 5.

In such storage grids foreign debris like dust builds up on or within the grid structure, rails and base. Furthermore, other kinds of foreign debris like dirt may build up due to spillages from bins containing fluids and/or organic matter (such as food products). Also, the vehicles themselves may cause accumulation of foreign debris on or within the storage grid. It is therefore a need for a solution that enables cleaning of the storage grid.

Traditionally storage grids of the above mentioned type are cleaned manually, causing an undesired halt in the operation of the storage system in order for a person to access the storage grid for cleaning. The efficiency of the system is therefore reduced significantly whenever cleaning is performed.

A robotic service device for cleaning rails of a storage system is known from WO 2015/140216 A1, wherein the service device is provided with cleaning means like brushes to clean the rails. Since the cleaning means are attached between the wheels of the service device, the prior art solution does not allow cleaning of the grid structure or the base/floor of the storage grid.

It is therefore a need for a method and a device which enables an efficient and non-interrupting cleaning of foreign debris from the storage grid.

BRIEF SUMMARY OF THE INVENTION

The present invention is set forth and characterized in the main claims, while the dependent claims describe other characteristics of the invention.

In particular, embodiments of the invention concern a vehicle operated cleaning bin for cleaning a storage grid of a storage system. The cleaning bin comprises: connecting means suitable for attaching the cleaning bin to a lifting device of a remotely operating vehicle being configured to vertically convey the cleaning bin into the storage grid by aid of the lifting device; and cleaning means for removing foreign debris from the storage grid, wherein at least one cleaning means is arranged at a bottom wall of the cleaning bin and at least one cleaning means is arranged on at least one lateral wall of the cleaning bin.

The lifting device may comprise a lifting beam and one or more lifting belts extending from the bulk of the vehicle to the cleaning bin. As an example, the cleaning bin may be picked up from a remotely operating vehicle in the same or similar matter as described in patent publication WO 2014/090684. In this prior art solution the lifting device of the remotely operating vehicle comprises a plurality of lifting belts connected between the bulk of the vehicle and a lifting beam. The lifting beam is configured to be attached to the connection means of the storage bin while the lifting belt enables the storage bin to be vertically conveyed into and out of the columns of the storage grid.

The connection means suitable for attaching the inventive cleaning bin to the lifting beam may be any kind of means which enables attachment of the cleaning bin to the lifting beam of the lifting device. The lifting beam may comprise a gripping device such as clips or hooks which can be clipped/hooked on to the connection means of the cleaning bin. Alternatively, the cleaning bin may be attached magnetically or electromagnetically to the lifting device.

In an advantageous embodiment the cleaning means comprises at least one of a vacuum cleaner, a sweeping device, a spray device and a cooling device. The vacuum cleaner is configured to absorb/suck up foreign debris, for example via a nozzle.

The sweeping device is considered to be any kind of cleaning equipment configured to displace foreign debris such as brush, cloth, sponge, mop, etc.

The spray device may utilize cleaning fluids being discharged from the cleaning bin, for example by discharge through a nozzle that cause a mass of dispersed cleaning fluid droplets or particles to be sprayed on to the surface of the area to be cleaned. The cleaning fluid may be a solvent or any other solutions suitable for removing stains, for example a cleaning agent such as liquid soap.

The cooling device may be any kind of device which may freeze or cool down foreign debris to be removed, for example by generating a flow of cold fluid towards the debris. The cooling device may comprise a container of compressed air which, when discharged through a nozzle, generates cold air by adiabatic cooling. The cooling device may also utilize a cold liquid such as liquid nitrogen being disposed on to the foreign debris to be removed.

The foreign debris may be any kind of foreign substances such as dust, sand, fat, oil, liquid, etc.

In another advantageous embodiment the cleaning means comprises a plurality of brushes, vacuum cleaners, cooling devices and spray devices, preferably arranged in an alternating manner. Such an alternating arrangement results in a more effective and even cleaning of the area to be cleaned. The cleaning means such as vacuum cleaners, spray devices and/or cooling devices may be equipped with one or more nozzles being movable in various directions towards the grid structure and/or the base, thereby maximizing the reachable area to be cleaned.

In another advantageous embodiment the cleaning bin comprises a bottom orientated parallel to the base of the storage grid, and at least one lateral wall orientated parallel with the columns of the storage grid and where the cleaning means are distributed over at least the bottom of the cleaning bin or at least one of the at least one lateral wall. The cleaning means may for example be distributed on or within the bottom and on or within all the lateral walls of the cleaning bin. The cleaning means may also be arranged at any corners of the cleaning bin.

In another embodiment the cleaning bin comprises a vacuum cleaner absorbing the foreign debris into a waste container located inside the cleaning bin. The waste container may be emptied at any time, for example by moving the remotely operating vehicle handling the cleaning bin to a designated space on or adjacent to the storage grid into which the foreign debris inside the waste container can be discharged.

The cleaning means such as nozzles, sweeping devices etc, may protrude through the lateral wall(s) and/or the bottom wall of the cleaning bin during use only, in order to ensure space optimization.

The term internal surface of the lateral walls or bottom is hereinafter defined as the surface facing the inside of the cleaning bin, while the term external surface is defined as the surface facing the surroundings of the cleaning bin.

According to another advantageous embodiment the cleaning means can also be activated while the vehicle is moving on the rails, thereby enabling effective cleaning of the rails. In such a case the cleaning means situated at the bottom of the cleaning bin are preferably activated and utilized.

According to another advantageous embodiment the cleaning means comprises a sweeping device and a vacuum cleaner at the bottom wall of the cleaning bin, wherein the sweeping device is configured to facilitate absorption of foreign debris by the vacuum cleaner. The sweeping devices may be configured to sweep in the direction that maximizes absorption by the vacuum cleaners.

According to another advantageous embodiment the cleaning bin further comprises a power source such as a rechargeable battery being configured to provide the required amount of power to the cleaning means during cleaning. Examples of rechargeable batteries are Lithium-Ion battery, Nickel-Cadmium battery, Nickel-Metal Hydride battery, Lithium-Ion Polymer battery, Thin Film battery and Smart battery Carbon Foam-based Lead Acid battery.

According to another advantageous embodiment the cleaning bin further comprises detection means configured to detect the charging level of the power source. The detection means is preferably configured to enable transmission of communication signals containing information concerning present charging level of the power source to the vehicle handling the cleaning bin. When the charging level of the power source goes below a certain threshold which indicates the need of charging, the vehicle is instructed to move the cleaning bin with the power source to a suitable charging station located on or adjacent to the storage grid.

According to another advantageous embodiment the cleaning bin is equipped with detection means configured to detect foreign debris inside the storage grid and to transmit the communication signals containing information concerning the detection of the foreign debris to a control unit. These communication signals may be further transmitted to the cleaning bin and/or to the remotely operating vehicle handling the cleaning bin instructing the cleaning bin to be moved to the area of the storage grid comprising the detected foreign debris and to initiate cleaning. Such detection means may include any kind of cameras and/or any kind of sensors for chemical detection. By using such detection means both before and during cleaning the cleaning bin may continue cleaning until an amount of foreign debris of the relevant area has been removed or reduced to a desired level. The control unit(s) can be situated anywhere inside or outside the storage system. However, in a preferred embodiment, the control unit is a computer or part of a computer situated at one or more bin receiving ports immediately outside the storage system. Any transmission of communication signals may be wireless.

According to another advantageous embodiment the vacuum cleaner comprises dust measuring means for detecting and measuring dust within air drawn through a suction inlet of the vacuum cleaner. Such a detection means may be of any commercially type, for example an air quality monitor using emission and receipt of light. The detection means may further comprise a transmitter for communicating signals to control unit(s) when no dust is detected, wherein the control unit(s) transmit(s) signals to switch off the vacuum cleaner.

According to another advantageous embodiment any waste container inside the cleaning bin may comprise detection means for detection of the amount of foreign debris there within, and to transmit communication signals containing information of the amount of foreign debris to control unit(s). When the waste container needs to be emptied, the control unit(s) transmit(s) communication signals to the vehicle handling the cleaning bin with instructions to move the cleaning bin to a specific container/space on or adjacent to the storage grid into which the waste container can be emptied.

Embodiments of the invention also concern a vehicle assembly suitable for cleaning a storage grid of a storage system, wherein the vehicle assembly comprises a remotely operating vehicle and a cleaning bin. The vehicle further comprises a lifting device connected to the cleaning bin via cleaning bin situated connection means. The cleaning bin of the vehicle assembly is further configured to be vertically conveyed into the storage grid via the lifting device of the remotely operating vehicle.

The lifting device of the remotely operating vehicle comprises a lifting beam and a lifting belt, wherein the lifting beam is connected to the cleaning bin via cleaning bin situated connection means, and the lifting belt(s) connect(s) the lifting beam with the remotely operating vehicle.

According to an advantageous embodiment the remotely operating vehicle of the vehicle assembly comprises a power source providing power supply to the cleaning means via for example communication cables.

According to an advantageous embodiment the vehicle assembly further comprises detection means or measurement means configured to detect/measure the charging level of the power source. The detection means may further be configured to transmit communication signals containing information of the charging level. When this charging level goes below a certain threshold indicating the need for charging the control unit may transmit communication signals to the remotely operating vehicle instructing the vehicle to move the vehicle assembly to a charging/exchange station for charging/exchange of the power source. The power source can be a dedicated power source located on or within the cleaning bin. Alternatively, or in addition, the power source may be the power source used to operate the remotely operating vehicle. In the latter case, power distributing means between the remotely operating vehicle and the cleaning bin is required.

According to an advantageous embodiment the cleaning bin of the vehicle assembly also comprises a waste container. The waste container may further comprise detection means configured to detect the amount of foreign debris within the waste container and to transmit communication signals containing information concerning the amount of foreign debris to a control unit. When the waste container needs to be emptied, the control unit transmits communication signals to the remotely operating vehicle handling the cleaning bin with the instruction to move the cleaning bin to a specific location within the storage system wherein the waste container can be emptied.

According to another advantageous embodiment the remotely operating vehicle of the vehicle assembly comprises a cavity into which the cleaning bin is placed.

In a preferred configuration the remotely operating vehicle has a cross-sectional area facing the storage grid which is at most equal to the cross-sectional area of the underlying column, hence occupying merely the space on top of one column.

Embodiments of the invention also concern a storage system comprising: a storage grid configured to accommodate a plurality of vertical stacks of storage bins, comprising a plurality of columns separated by equally spaced vertical pillars and a top level of laterally arranged rails, at least one remotely operating vehicle comprising a lifting device, the vehicle being moveably arranged on the top level of rails, and a cleaning bin connectable to at least one of the at least one operating vehicle via the connecting means.

According to an advantageous embodiment the storage system further comprises at least one charging station for charging the power source of the vehicle operated cleaning bin.

According to another advantageous embodiment the storage system comprises the vehicle assembly as described above, wherein the remotely operating vehicle has a cross-sectional area facing the storage grid being at most equal to the cross-sectional area of the underlying storage column.

Embodiments of the invention also concern a method for cleaning a storage grid of a storage system, wherein the method comprises the following steps:

a) connecting the cleaning bin to the remotely operating vehicle via the connecting means, b) moving the remotely operating vehicle comprising the cleaning bin to the column to be cleaned, c) activating the cleaning means while conveying the cleaning bin vertically inside the column.

The activation of the cleaning means (step c)) can be performed in numerous ways in order to achieve a cleaning process where the amount of foreign debris is removed or at least significantly reduced.

Step c) may for example involve the following steps:
activating any cooling devices of the cleaning means during conveying of the cleaning bin vertically downwards from the top level of the grid structure towards the base of the storage grid, thereby cooling down any foreign debris situated on the storage grid,
deactivating said cooling devices after desired degree of cooling of foreign debris is achieved, and subsequently activating any sweeping devices and/or vacuum cleaners of the cleaning means while conveying the cleaning bin upwards towards the remotely operating vehicle handling the cleaning bin, thereby sweeping off and/or absorbing the foreign debris from the storage grid.

The latter steps may be particularly advantageous if the foreign debris is a type creating a strong bond to the storage grid and therefore difficult to remove, such as organic matter (oils, fat, etc).

The top level of the storage grid is the level comprising the laterally arranged rails onto which the remotely operating vehicles are moving.

According to an advantageous embodiment the method also ensures cleaning of the top level of laterally arranged rails by including the following step:
moving the remotely operating vehicle comprising the cleaning bin on the top level of laterally arranged rails of the storage grid when the cleaning means located at the bottom wall of said cleaning bin is in operation, thereby cleaning the rails.

The latter step may also be performed independently, that is without performing the steps of cleaning the rails.

Embodiments of the present invention enables the storage grid to be cleaned during normal operation of the system. The vehicle operated cleaning bin only occupies the specific column to be cleaned and perhaps one or more of the adjacent columns. The remaining part of the storage system is not affected.

In summary, embodiments of the inventive cleaning bin, the vehicle assembly, the storage system and the method provides a solution for removing, or at least significantly reducing, foreign debris from a storage grid in an effective and non-interrupting manner. The cleaning bin is configured to clean both the storage grid and external surfaces of adjacent storage bins stored inside the storage grid.

The term "means" used herein is to be interpreted as a device.

In the following description, numerous specific details are introduced to provide a thorough understanding of embodiments of the claimed cleaning bin, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION OF THE INVENTION

Hereinafter all relative terms such as upper, lower, lateral, vertical, top, X-direction, Y-direction, Z-direction, Z'-direction etc., shall be interpreted using the above mentioned prior art storage system 13 as reference system.

Figure 1:
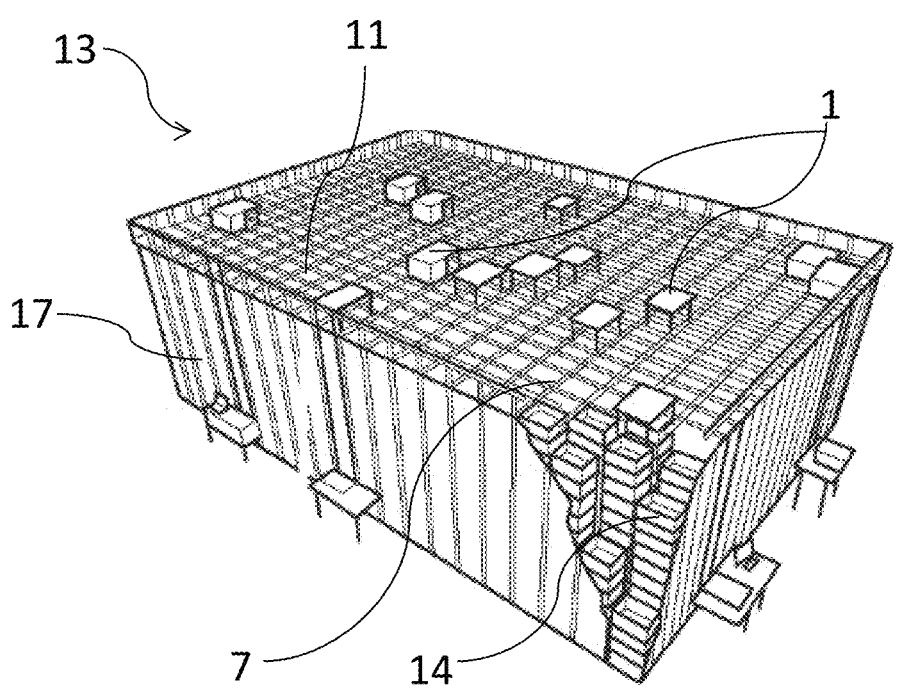
FIG. 1 is a perspective view of a prior art storage system.

FIG. 1 is a partly cut perspective view of a storage system 13 according to the background art, which has already been referred to in the background section.

Figure 2:
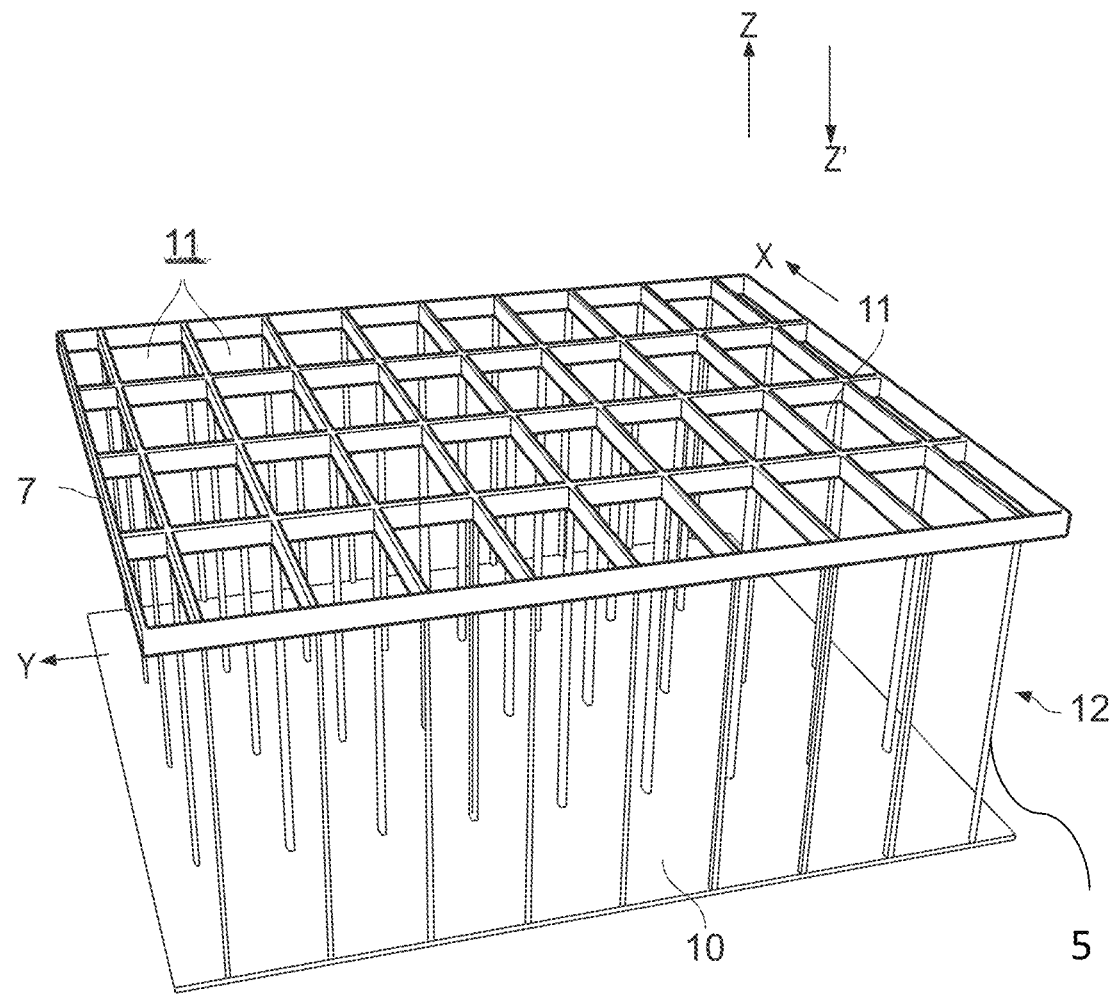
FIG. 2 is a perspective view of a prior art storage grid.

FIG. 2 is a partly cut perspective view of a storage grid 12 according to background art comprising a grid structure 5, a top level of laterally arranged rails 7 and a base 10.

Figure 3:
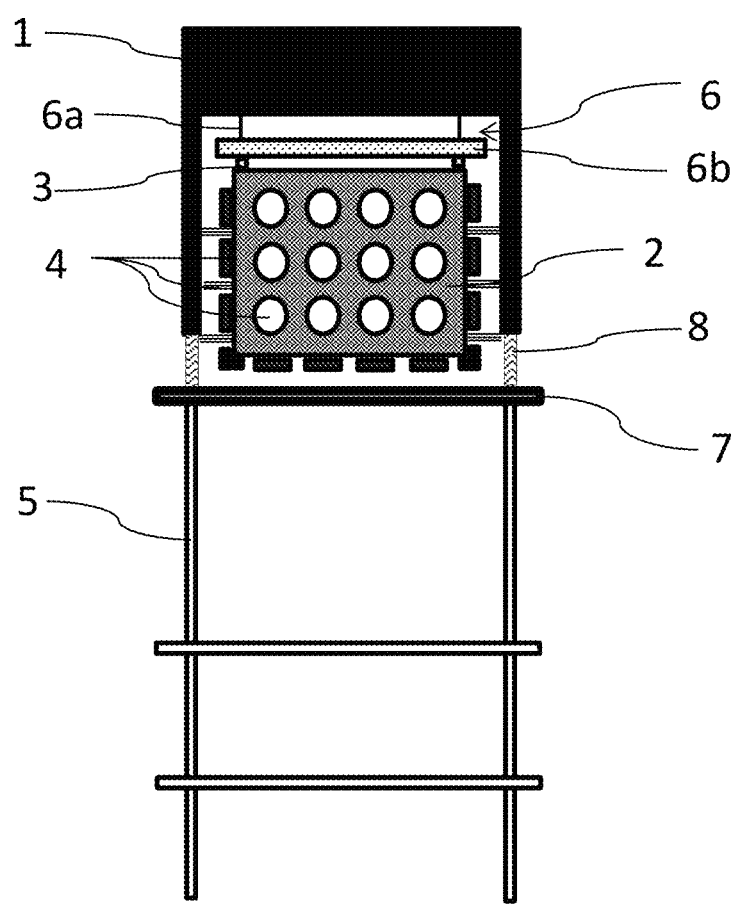
FIG. 3 is a side view of a remotely operating vehicle situated on a storage grid and comprising a cleaning bin according to embodiments of the invention.

FIG. 3 is a side view of a vehicle assembly according to embodiments of the invention comprising a remotely operating vehicle 1 and a cleaning bin 2. The remotely operating vehicle 1 is situated on the top level of laterally arranged rails 7 wherein the vehicle 1 further comprises a cavity 23 wherein a cleaning bin 2 is placed. The remotely operating vehicle 1 comprises a displacement motor (not shown) and vehicle rolling means 8 allowing movement of the vehicle 1 along a first direction (X) and a second direction (Y).

The cleaning bin comprises connection means 3 attached to a lifting beam 6b of a lifting device 6 situated on the remotely operating vehicle 1. The lifting device 6 further comprises a lifting belt 6a arranged to convey the cleaning bin 2 vertically down in a direction (Z') and vertically up in a direction (Z) within a column 11 of the gird structure 5 as shown in FIG. 2.

Further the cleaning bin 2 comprises cleaning means 4 which are arranged to remove foreign debris from the storage grid 12. The cleaning means comprises at least one of a vacuum cleaner 4a, a sweeping device 4b, a cooling device 4c and a spray device 4d.

The configuration of the vehicle assembly illustrated in FIG. 3 can be used to clean the rails 7 on the storage grid 12. In such a configuration at least the cleaning means 4 situated at the bottom wall 15 of the cleaning bin 2 are activated. The vehicle assembly may move along the directions X or Y while the cleaning means 4 are simultaneously active cleaning the rails 7. The vehicle assembly may on the other hand stand still during cleaning of the rails 7. Depending on what kind of foreign debris is to be removed, different kind of cleaning means 4 are activated. If dust is to be removed, the sweeping device 4b and the vacuum cleaner 4a can be activated. The sweeping device 4b will move the dust towards the vacuum cleaner 4a which will absorb the dust. If organic matter such as fat is to be removed the cooling device 4c can be activated to cool down the fat to such an extent that it can be removed by the sweeping device 4b which will move the foreign debris towards the vacuum cleaner 4a which will absorb the foreign debris. The sweeping device 4b and vacuum cleaner 4a can be activated after the foreign debris has been cooled down. One or a plurality of cleaning means 4 can be activated depending on the amount and the kind of foreign debris that needs to be removed.

The figure also shows detection means 22 located on the power source 19 configured to detect the charging level of the power source 19 which supplies power to the vehicle 1 and optionally also to the cleaning means 4 of the cleaning bin 2.

Figure 4:
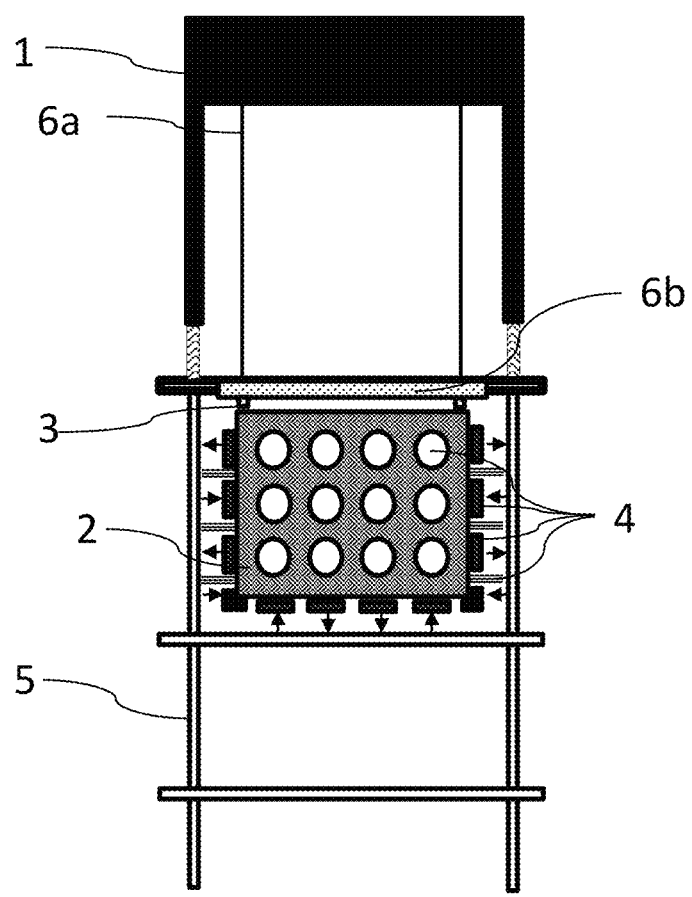
FIG. 4 is a side view of a remotely operating vehicle vertically conveying a cleaning bin according to embodiments of the invention inside a grid structure.

FIG. 4 is also a side view of the same vehicle assembly as illustrated in FIG. 3 wherein the cleaning bin 2 has been vertically conveyed downwards, by aid of the lifting belts 6a of lifting device 6, towards the base 10 of the storage grid 12 in a direction Z' compared to the position of the cleaning bin in FIG. 3. The arrows placed close to the cleaning means 4 indicate that the cleaning means 4 are activated.

In the illustrated embodiment the remotely operating vehicle 1 has a cross-sectional area facing the storage grid 12 which is at most equal to the cross-sectional area of the underlying column 11, hence occupying merely the space on top of one column 11. During cleaning the cleaning means 4 situated on or within the bottom 15 and on or within lateral walls 16 (see FIG. 6) of the cleaning bin 2 are activated in order to clean the grid structure 5 of the storage grid 12 while conveying the cleaning bin 2.

This configuration allows the remaining part of the storage grid 12 not to be affected, thus enabling the remaining part of the storage system 13 to run in a non-interrupting manner.

If for example organic matter such as fat is to be removed from the grid structure 5 of the storage grid 12, the cooling devices 4c can be activated while conveying the cleaning bin 2 downwards in the direction Z'. When all the foreign debris to be removed are sufficiently cooled, enabling them to be moved by the sweeping device 4b, the cooling device 4c can be deactivated. Thereafter the sweeping devices 4b and vacuum cleaners 4a can be activated to sweep off the foreign debris from the storage grid 12 with the sweeping device 4b followed by removing them with the vacuum cleaner 4a while conveying the cleaning bin 2 upwards in the direction Z.

In another configuration organic matter may be removed from the storage grid 12 by activating the spray device 4d comprising cleaning fluids being discharged from the cleaning bin 2 causing a mass of dispersed cleaning fluid droplets or particles to be sprayed on to the surface of the area to be cleaned. By subsequently activating the sweeping devices 4b the foreign debris will be swept off.

If dust or sand is to be removed from the storage grid 12 the sweeping device 4b and the vacuum cleaner 4a can be activated in both or either one of the directions Z or Z' while conveying the cleaning bin 2 downwards Z' and upwards Z within the column 11 of the storage grid 12.

It should be noted that the external surface of a storage bin 14 facing the cleaning bin 2 and placed in an adjacent column 11 to the cleaning bin 2 may be cleaned by activating the cleaning means 4 situated on or within the lateral walls 16 of the cleaning bin 2 since the grid structure 5 is an open structure, meaning that there are no walls between adjacent columns 11.

It should also be noted that the part of the wall 17 of the storage system 13 facing the storage grid 12 may be cleaned by situating the cleaning bin 2 in a column 11 adjacent to the wall 17 to be cleaned and activating the cleaning means 4 situated on or within the lateral wall 16 facing the wall 17 of the storage system 13.

The cleaning bin 2 may be conveyed down to the base of the storage grid 10 in order to clean the base 10, and the cleaning means 4 situated on or within the bottom 15 (see FIG. 6) of the cleaning bin 2 are activated. Since the grid structure 5 is an open structure, the cleaning bin 2 may comprise a skirt (not shown) extending from the bottom 15 of the cleaning bin 2 to the base of the storage grid 10, thereby enclosing the area situated directly underneath the cleaning bin 2. By enclosing the area to be cleaned, the foreign debris is not able to escape to other parts of the storage grid 12, and is therefore easier removed by the cleaning bin 2.

Figure 5A:
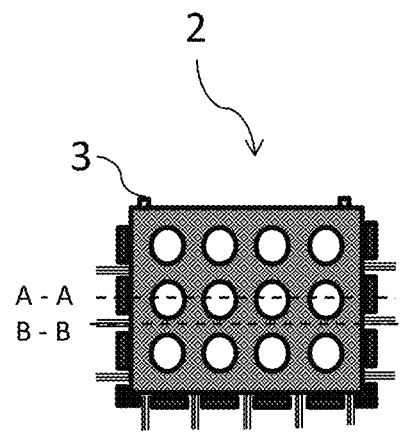
FIG. 5a is side view of a cleaning bin according to the invention.
Figure 5B:
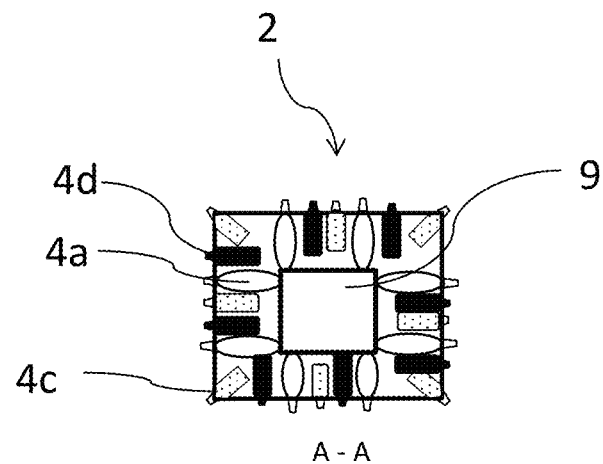
FIG. 5b is a cross sectional view, A-A, of a cleaning bin according to embodiments of the invention.
Figure 5C:
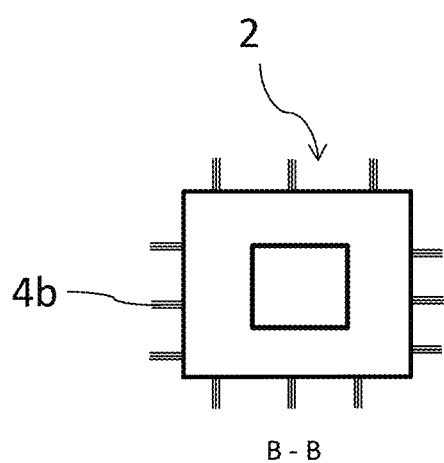
FIG. 5c is a cross sectional view, B-B, of a cleaning bin according to embodiments of the invention.

FIG. 5a is a side view of the cleaning bin 2 according to the invention, and FIGS. 5b and 5c illustrate cross sectional views of A-A and B-B respectively as illustrated in FIG. 5a, revealing internal components of the cleaning bin 2.

FIG. 5b illustrate a cross sectional view of the cleaning bin 2 comprising a plurality of vacuum cleaners 4a, cooling devices 4c and spray devices 4d positioned in an alternating configuration, wherein the nozzles of each device, 4a, 4b and 4c, is protruding through the lateral walls 16 of the cleaning bin 2. The nozzles may be configured to be able to turn in different directions towards the grid structure 5 to be cleaned thereby maximizing the reachable area to be cleaned.

As the figure illustrates, the cleaning means 4 may also be positioned on or within the corners of the cleaning bin 2.

A waste container 9, wherein the foreign debris absorbed by the vacuum cleaners 4a are discharged, is shown in the center of the cleaning bin 2, but can be positioned anywhere inside the cleaning bin 2. The waste container comprises openings connected to the vacuum cleaners 4a. The foreign debris absorbed by the vacuum cleaners 4a is discharged into the waste container 9. When the waste container 9 needs to be emptied, the cleaning bin 2 will be moved to a specific container/space on or adjacent to the storage grid 12 wherein it can be emptied.

FIG. 5c illustrates the cross sectional view of the cleaning bin 2 comprising a plurality of sweeping devices 4b placed in a fixed distance from each other. The figure illustrates, due to simplicity, sweeping devices placed on the external surface 16' of all the lateral walls 16. It should though be understood that the sweeping devices may be placed on the external surfaces 15' and 16' of the walls 15 and 16 or within the walls 15 and 16.

Preferably the cleaning means 4 of the same type, such as all the sweeping devices 4b, are arranged on or within the walls 15 and 16 of the cleaning bin 2, in a distance close enough to be able to maximize the reachable area to be cleaned.

Figure 6A:
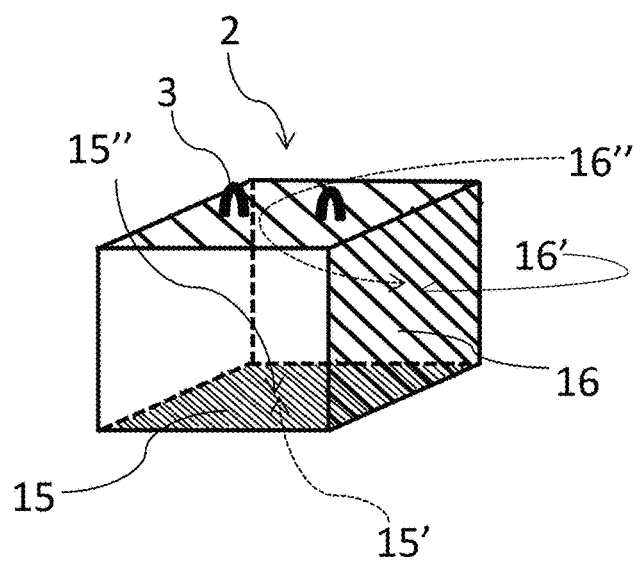
FIG. 6a is perspective view of a cleaning bin according to embodiments of the invention.
Figure 6B:
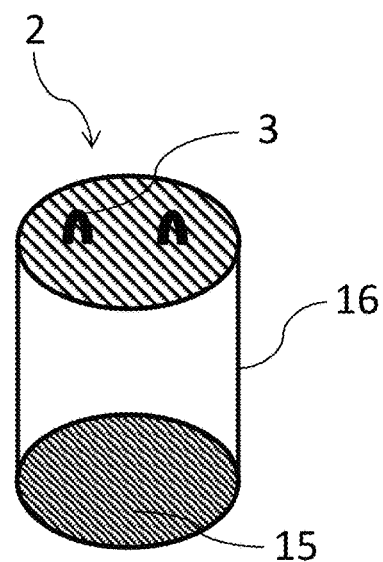
FIG. 6b is perspective view of a cleaning bin according to embodiments of the invention.

FIGS. 6a and 6b are perspective views of two different configurations of the cleaning bin 2. FIG. 6a is illustrating a cubic configuration comprising four lateral walls 16, and FIG. 6b illustrating a cylindrical configuration of the cleaning bin 2 comprising one lateral wall 16. The invention is not limited to any of these two configurations.

All the operations of the remotely operating vehicle 1 and cleaning means 4 can be controlled by wireless communication means and remote control units. This includes control of the movement of the remotely operating vehicle 1, lifting device 6, any remotely operating vehicle positions and the direction of the nozzles of the cleaning means 4, and also control of the activation and deactivation of cleaning means 4 of the cleaning bin 2.

Further the vehicle assembly comprises detection means 20, 22 configured to detect the charging level of a power source 18,19 which may be situated only on the remotely operating vehicle 1 or on both the remotely operating vehicle 1 and cleaning bin 2. In the case wherein the power source 19 is situated only on the remotely operating vehicle 1, the detection means 22 on the power source 19 will transmit signals to a control unit instructing the remotely operating vehicle 1 to move to a charging unit or exchange station when the power source 19 needs to be charged or exchanged. If there is an additional power source 18 on the cleaning bin 2, this power source 18 will also comprise detection means 20 transmitting signals to a control unit instructing the remotely operating vehicle 1 to move the cleaning bin 2 to a charging unit or exchange station whenever charging or exchange of the additional power source 18 is needed.

Detection means 21 may also be placed on the waste container 9 detecting the amount of foreign debris within the waste container 9 and to transmit communication signals containing information concerning the amount of foreign debris to a control unit. When the waste container 9 needs to be emptied, the control unit transmits communication signals to the remotely operating vehicle 1 handling the cleaning bin 2 with the instruction to move the cleaning bin 2 to a specific location within the storage system 13 wherein the waste container 9 can be emptied.

The power source 18 of the cleaning bin 2 can be positioned anywhere on the cleaning bin 2. The power source 18 can i.e. be positioned inside the cleaning bin 2 as illustrated in FIG. 6, or on or within the outside wall. The power source 19 of the remotely operating vehicle 1 can also be positioned anywhere on the remotely operating vehicle 1. The power source 19 can i.e. be positioned on the outside wall as illustrated in FIG. 3, or it can be positioned inside the cavity or within the outside wall of the remotely operating vehicle 1.

The control unit(s) can be positioned anywhere inside and outside the storage system as long as it can transmit signals to and from the detection means 20, 21, 22. One exemplary location is within a user operated computer in one or more of the bin receiving ports associated with the storage grid.

In the preceding description, various aspects of the assembly according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS 1 remotely operating vehicle/robot
2 vehicle operated cleaning bin/cleaning bin
3 connecting means
4 cleaning means
4a vacuum cleaner
4b sweeping device
4c cooling device
4d spray device
5 grid structure
6 lifting device
6a lifting belt
6b lifting beam
7 rails
8 vehicle rolling means on the remotely operating vehicle
9 waste container
10 base of the storage grid
11 cells/columns
12 storage grid
13 storage system
14 storage bin
15 bottom/bottom wall of the cleaning bin
15' external surface of the bottom wall
16 lateral wall of the cleaning bin
16' external surface of the lateral wall
17 wall of the storage system
18 power source of the cleaning bin
19 power source of the remotely operating vehicle and optionally also the cleaning bin
20 detection means of the power source of the cleaning bin
21 detection means of the waste container
22 control unit
23 cavity of the remotely operating vehicle

What is claimed is:

1. A vehicle operated cleaning bin for cleaning a storage grid of a storage system, wherein the cleaning bin comprises:
   connecting means for attaching the cleaning bin to a lifting device of a remotely operating vehicle being configured to vertically convey the cleaning bin inside a column of the storage grid by aid of the lifting device during cleaning, and
   a plurality of cleaning means for removing foreign debris from the storage grid,
   wherein the plurality of cleaning means are arranged on at least one lateral wall of the cleaning bin.

2. The cleaning bin in accordance with claim 1, wherein the cleaning means comprises at least one of a vacuum cleaner, a sweeping device, a cooling device, and a spray device.

3. The cleaning bin in accordance with claim 1, wherein the cleaning means comprises a vacuum cleaner and wherein the cleaning bin further comprises a waste container into which the foreign debris are removed by the vacuum cleaner are discharged.

4. The cleaning bin in accordance with claim 1, wherein the cleaning means comprises at least two of a vacuum cleaner, a sweeping device, a cooling device, and a spray device positioned in an alternating configuration.

5. The cleaning bin in accordance with claim 1, wherein the cleaning means comprises a sweeping device and a vacuum cleaner at a bottom wall of the cleaning bin and wherein the sweeping device is configured to facilitate absorption of foreign debris by the vacuum cleaner.

6. The cleaning bin in accordance with claim 1, wherein cleaning bin comprises at least one power source.

7. The cleaning bin in accordance with claim 6, wherein the power source is rechargeable.

8. The cleaning bin in accordance with claim 6, wherein the cleaning bin further comprises detection means configured to detect the charging level of the power source and to transmit communication signals of the charging level to the remotely operating vehicle holding the cleaning bin during use.

9. The cleaning bin in accordance with claim 1, wherein the cleaning bin comprises detection means to detect the amount of foreign debris within the waste container during use and to transmit communication signals of the amount of foreign debris to a control unit.

10. A vehicle assembly for cleaning a storage grid of a storage system, wherein the vehicle assembly comprises a remotely operating vehicle and a cleaning bin according to claim 1, wherein the remotely operating vehicle comprises the lifting device, wherein the lifting device is connected to the cleaning bin via the connecting means.

11. The vehicle assembly in accordance with claim 10, wherein the lifting device comprises a lifting beam and a lifting belt, the lifting beam being connected to the connection means and the lifting belt being connected to the remotely operating vehicle.

12. The vehicle assembly in accordance with claim 10, wherein the vehicle assembly comprises a power source supplying power to the cleaning means.

13. The vehicle assembly in accordance with claim 12, wherein the vehicle assembly comprises detection means configured to detect the charging level of the power source.

14. The vehicle assembly in accordance with claim 10, wherein the remotely operating vehicle displays a cavity into which the cleaning bin may be positioned.

15. A storage system comprising:
   a storage grid configured to accommodate a plurality of vertical stacks of storage bins, comprising a plurality of columns separated by equally spaced vertical pillars and a top level of laterally arranged rails,
   at least one remotely operating vehicle comprising a lifting device, the remotely operating vehicle being moveably arranged on the top level of rails, and
   a vehicle operated cleaning bin for cleaning a storage grid of a storage system, wherein the cleaning bin comprises:
   connecting means for attaching the cleaning bin to a lifting device of a remotely operating vehicle being configured to vertically convey the cleaning bin inside a column of the storage grid by aid of the lifting device during cleaning, and
   a plurality of cleaning means for removing foreign debris from the storage grid,
   wherein the plurality of cleaning means are arranged on at least one lateral wall of the cleaning bin, and
   wherein the cleaning bin is connectable to at least one of the at least one remotely operating vehicle via connecting means.

16. The storage system in accordance with claim 15, comprising a charging station for charging a power source of the cleaning bin.

17. The storage system in accordance with claim 15, comprising a vehicle assembly for cleaning a storage grid of a storage system, wherein the vehicle assembly comprises a remotely operating vehicle and a vehicle operated cleaning bin for cleaning a storage grid of a storage system, wherein the cleaning bin comprises:
   connecting means for attaching the cleaning bin to a lifting device of a remotely operating vehicle being configured to vertically convey the cleaning bin inside a column of the storage grid by aid of the lifting device, and
   a plurality of cleaning means for removing foreign debris from the storage grid,
   wherein the plurality of cleaning means are arranged on at least one lateral wall of the cleaning bin,
   wherein the remotely operating vehicle comprises the lifting device,
   wherein the lifting device is connected to the cleaning bin via the connecting means, wherein the lifting device comprises a lifting beam and a lifting belt, the lifting beam being connected to the connection means and the lifting belt being connected to the remotely operating vehicle,
   wherein the remotely operating vehicle has a cross-sectional area facing the storage grid being at most equal to the cross-sectional area of the underlying column.

18. A method for cleaning a storage grid of a storage system, wherein the storage system is in accordance with claim 15, and wherein the method comprises:
   a) connecting the cleaning bin to the remotely operating vehicle via the connecting means,
   b) moving the remotely operating vehicle comprising the cleaning bin to the column to be cleaned,
   c) activating the cleaning means arranged on at least one later wall of the cleaning bin while conveying the cleaning bin vertically inside the column.

19. The method in accordance with claim 18, wherein step c) comprises:
- prior to or during conveyance of the cleaning bin vertically downwards towards the base of the storage grid, activating a cooling device for cooling down the foreign debris on the storage grid,
- deactivating said cooling devices and,
- prior to or during conveyance of the cleaning bin upwards towards the remotely operating vehicle, activating at least one of a sweeping device configured to sweep foreign debris from the storage grid and a vacuum cleaner configured to absorb foreign debris from the storage grid.

20. The method in accordance with claim 18, wherein step c) comprises:
- prior to or during conveyance of the cleaning bin vertically downwards towards the base of the storage grid, activating at least one spray device for dissolving foreign debris on the storage grid,
- deactivating said spray device, and
- prior to or during conveyance of the cleaning bin upwards towards the remotely operating vehicle, activating at least one of a sweeping device configured to sweep foreign debris from the storage grid and a vacuum cleaner configured to absorb foreign debris from the storage grid.

21. The method in accordance with claim 18, wherein step c) comprises:
- prior to or during conveyance of the cleaning bin upwards towards the remotely operating vehicle, activating at least one of a sweeping device being configured to sweep foreign debris from the storage grid, activating at least one of a sweeping device configured to sweep foreign debris from the storage grid and a vacuum cleaner configured to absorb foreign debris from the storage grid,
- keeping the said cleaning means active until the cleaning bin has returned back to the remotely operating vehicle.

22. A method in accordance with claim 18, comprising:
- moving the remotely operating vehicle comprising the cleaning bin on the top level of laterally arranged rails of the storage grid during operation of the cleaning means situated at the bottom of said cleaning bin, thereby cleaning the rails.

\* \* \* \* \*